(12) United States Patent
Ramirez de Santiago et al.

(10) Patent No.: US 10,246,912 B2
(45) Date of Patent: Apr. 2, 2019

(54) LOCATOR FEATURE FOR AUTOMOTIVE INTERIOR DOORS

(71) Applicant: FORD GLOBAL TECHNOLOGIES, LLC, Dearborn, MI (US)

(72) Inventors: Carlos Ramirez de Santiago, Mexico City (MX); Jose Enrique Gallardo Almiray, Queretaro (MX)

(73) Assignee: Ford Global Technologies LLC, Dearborn, MI (US)

( * ) Notice: Subject to any disclaimer, the term of this patent is extended or adjusted under 35 U.S.C. 154(b) by 74 days.

(21) Appl. No.: 15/355,524

(22) Filed: Nov. 18, 2016

(65) Prior Publication Data

US 2018/0142508 A1     May 24, 2018

(51) Int. Cl.
| | |
|---|---|
| E05B 83/30 | (2014.01) |
| B60R 7/06 | (2006.01) |
| E05F 5/02 | (2006.01) |
| E05F 5/06 | (2006.01) |

(52) U.S. Cl.
CPC ................ *E05B 83/30* (2013.01); *B60R 7/06* (2013.01); *E05F 5/022* (2013.01); *E05F 5/06* (2013.01)

(58) Field of Classification Search
CPC ............. B60R 7/06; E05B 83/30; E05F 5/022
See application file for complete search history.

(56) References Cited

U.S. PATENT DOCUMENTS

| | | | | |
|---|---|---|---|---|
| 2,813,712 A | | 11/1957 | Stanis | |
| 5,314,280 A | * | 5/1994 | Gagliardi | B62D 25/163 29/525.02 |
| 5,482,348 A | * | 1/1996 | Mass | E05F 5/022 16/82 |
| 5,971,461 A | * | 10/1999 | Vaishnav | B60R 7/06 296/37.12 |
| 6,076,878 A | * | 6/2000 | Isano | B60R 7/06 16/82 |
| 6,088,878 A | * | 7/2000 | Antonucci | E05F 5/022 16/86 A |
| 6,152,501 A | | 11/2000 | Magi et al. | |
| 6,318,795 B1 | * | 11/2001 | Pyo | B60J 5/101 16/82 |
| 6,857,166 B2 | * | 2/2005 | Nakagaki | E05F 5/022 16/86 R |
| 6,945,579 B2 | | 9/2005 | Peck, Jr. et al. | |
| 6,945,583 B1 | | 9/2005 | Cowelchuk et al. | |
| 7,168,130 B2 | | 1/2007 | Shin | |

(Continued)

FOREIGN PATENT DOCUMENTS

CN       204136879 U      2/2015

OTHER PUBLICATIONS

English Machine Translation of CN204136879U.

*Primary Examiner* — Justin B Rephann
(74) *Attorney, Agent, or Firm* — Vichit Chea; King & Schickli PLLC

(57) ABSTRACT

An interior door assembly for a vehicle includes an outer door panel including at least one bumper retainer associated with an inner door locator feature. The at least one bumper retainer is defined by an aperture dimensioned to receive a portion of a bumper therein. The assembly further includes an inner door panel including at least one aperture configured and dimensioned to engage the inner door locator feature.

12 Claims, 4 Drawing Sheets

(56) References Cited

U.S. PATENT DOCUMENTS

| | | | | |
|---|---|---|---|---|
| 7,188,871 B2* | 3/2007 | Nemoto | E05B 83/30 | 292/121 |
| 7,566,081 B2* | 7/2009 | Aoyama | E05F 5/022 | 293/104 |
| 8,191,935 B2* | 6/2012 | Toppani | B60R 7/06 | 292/32 |
| 8,291,547 B2* | 10/2012 | Ukai | F16B 21/086 | 16/86 R |
| 8,579,325 B2* | 11/2013 | Roychoudhury | B60R 21/02 | 280/752 |
| 9,045,089 B1* | 6/2015 | Bisson | B60R 7/06 | |
| 9,181,745 B1* | 11/2015 | Diep | E05F 5/022 | |
| 9,316,031 B2* | 4/2016 | Abe | B60R 7/06 | |
| 9,410,354 B2* | 8/2016 | Nakasone | E05F 1/105 | |
| 9,739,327 B2* | 8/2017 | Kamiya | F16F 1/377 | |
| 2002/0003993 A1* | 1/2002 | Ichimaru | E05F 5/022 | 411/325 |
| 2004/0221424 A1* | 11/2004 | Matsuzawa | E05F 5/022 | 16/86.2 |
| 2005/0275146 A1* | 12/2005 | Shin | B60R 7/06 | 267/226 |
| 2005/0283943 A1* | 12/2005 | Shin | B60R 7/06 | 16/82 |
| 2006/0005589 A1* | 1/2006 | Hanjono | B60R 7/06 | 70/208 |
| 2006/0288528 A1* | 12/2006 | Dennis | E05F 5/022 | 16/82 |
| 2007/0182188 A1* | 8/2007 | Penner | B60R 7/06 | 296/37.12 |
| 2008/0073928 A1* | 3/2008 | Woo | B60R 7/06 | 296/37.12 |
| 2008/0136193 A1* | 6/2008 | Oh | B60R 7/06 | 292/164 |
| 2008/0290682 A1* | 11/2008 | Sauer | B60R 7/06 | 296/37.12 |
| 2011/0025074 A1* | 2/2011 | Reznar | E05B 5/00 | 292/33 |
| 2012/0112489 A1* | 5/2012 | Okimoto | B60R 7/06 | 296/37.12 |
| 2012/0256439 A1* | 10/2012 | Ayarturk | B60R 7/06 | 296/37.12 |
| 2015/0008680 A1* | 1/2015 | Suzuki | B60R 7/06 | 292/32 |
| 2015/0232036 A1* | 8/2015 | Porcs | B60R 7/06 | 296/70 |
| 2016/0144793 A1* | 5/2016 | Mazzocchi | B60R 7/06 | 296/37.12 |
| 2016/0194907 A1* | 7/2016 | Kikuchi | B60R 7/06 | 292/242 |
| 2016/0200277 A1* | 7/2016 | Merkel | B60R 21/045 | 280/752 |
| 2016/0339848 A1* | 11/2016 | Hodgson | E05B 65/0876 | |
| 2017/0016262 A1* | 1/2017 | Kwak | E05F 5/022 | |

* cited by examiner

US 10,246,912 B2

LOCATOR FEATURE FOR AUTOMOTIVE INTERIOR DOORS

TECHNICAL FIELD

This document relates generally to automotive interior doors.

BACKGROUND

A conventional door assembly for a vehicle interior door such as a glove box door includes an inner panel and an outer panel. Typically a latch mechanism including a latch rod is mounted to the outer panel, whereas one or more bumpers are mounted to the inner panel. The bumpers serve the function of providing a snug, rattle-free fit of the latched door assembly.

This construction introduces complexity during assembly. Any flaw in the assembly process can result in an out of position condition for the one or more bumpers, which in turn results in undesirable consequences such as noise (squeaking/rattling), bounce-back, or improper latching of the door assembly.

To solve this and other problems, this document relates to an interior door assembly for a vehicle which reduces the likelihood of a bumper out of position condition.

SUMMARY

In accordance with the purposes and benefits described herein, an interior door assembly for a vehicle is provided, comprising an outer door panel including at least one bumper retainer associated with an inner door locator feature. In embodiments, the inner door locator feature defines a quadrilateral cross-section. In other embodiments, the inner door locator feature defines a square cross-section. The outer door panel may further be configured to carry a latch mechanism.

The bumper retainers are defined by an aperture dimensioned to receive a portion of a bumper therein. In embodiments, the aperture is configured to retain the bumper by one of a snap-fit, a friction fit, an interference fit, and a screw-threaded fit. The described assembly may further include bumpers adapted for retention by the bumper retainer. In embodiments, the bumper may comprise a screw-threaded exterior surface.

The assembly may further include an inner door panel including at least one aperture configured and dimensioned to engage the inner door locator feature.

In the following description, there are shown and described several preferred embodiments of the described interior door assembly. As it should be realized, the device is capable of other, different embodiments and its several details are capable of modification in various, obvious aspects all without departing from the devices as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the interior door assembly and together with the description serve to explain certain principles thereof. In the drawing figures.

Reference will now be made in detail to embodiments of the disclosed interior door assembly, examples of which are illustrated in the accompanying drawing figures wherein like reference numerals indicate like features.

DETAILED DESCRIPTION

Preliminarily, the following description relates primarily to vehicle interior door assemblies for interior storage compartments such as glove boxes. However, it will be appreciated that the described interior door assemblies are readily adaptable to other structures and uses in a vehicle. Accordingly, the description will not be taken to be limited in this regard.

Figure 1A:
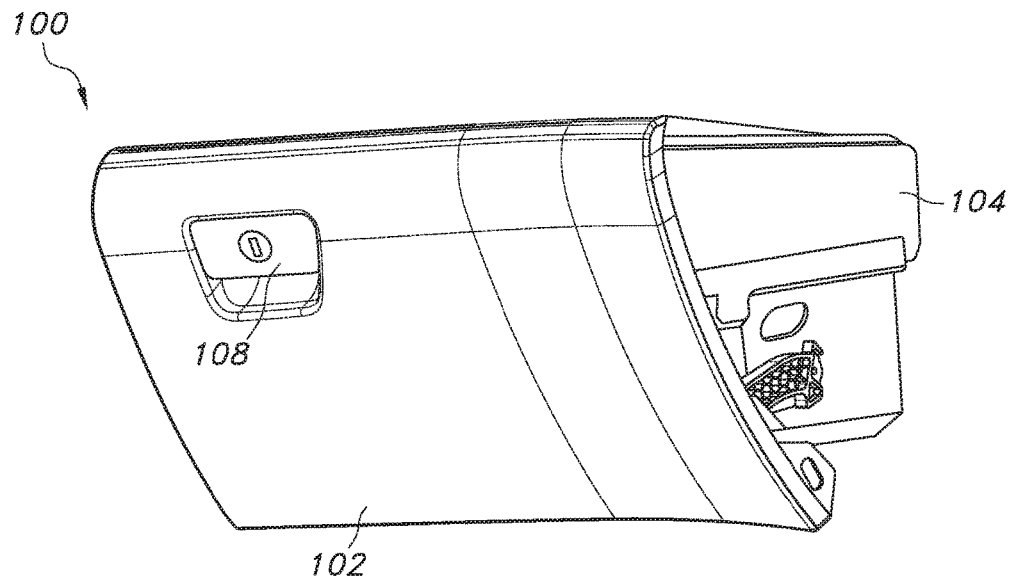
FIG. 1A shows a front perspective view of a prior art glove box including a door assembly in a closed position.
Figure 1B:
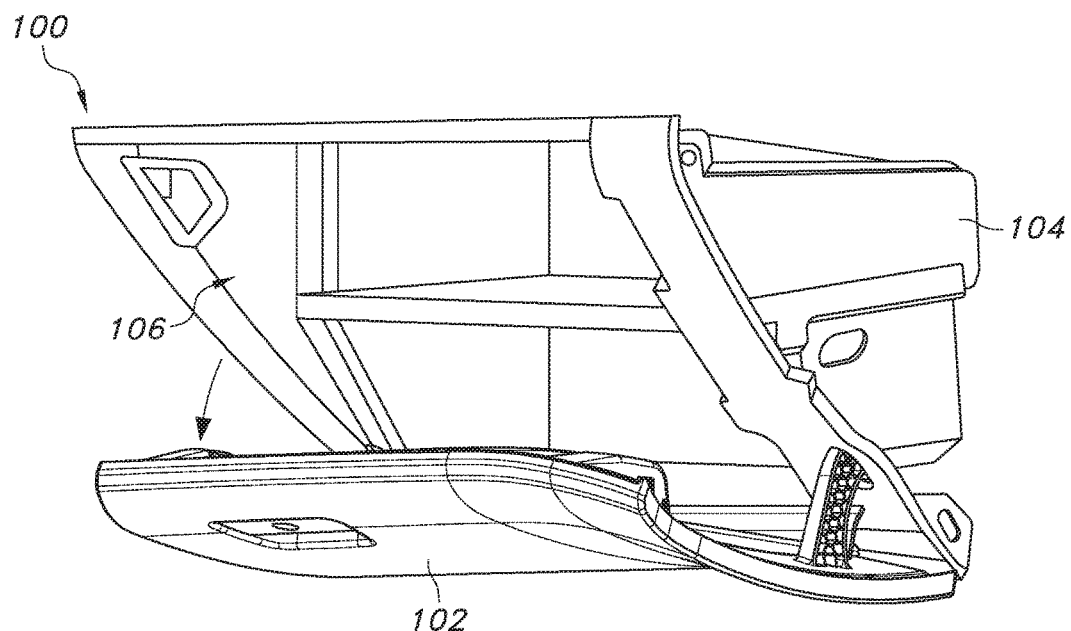
FIG. 1B shows the glove box of FIG. 1A with the door assembly in an open position.
Figure 1C:
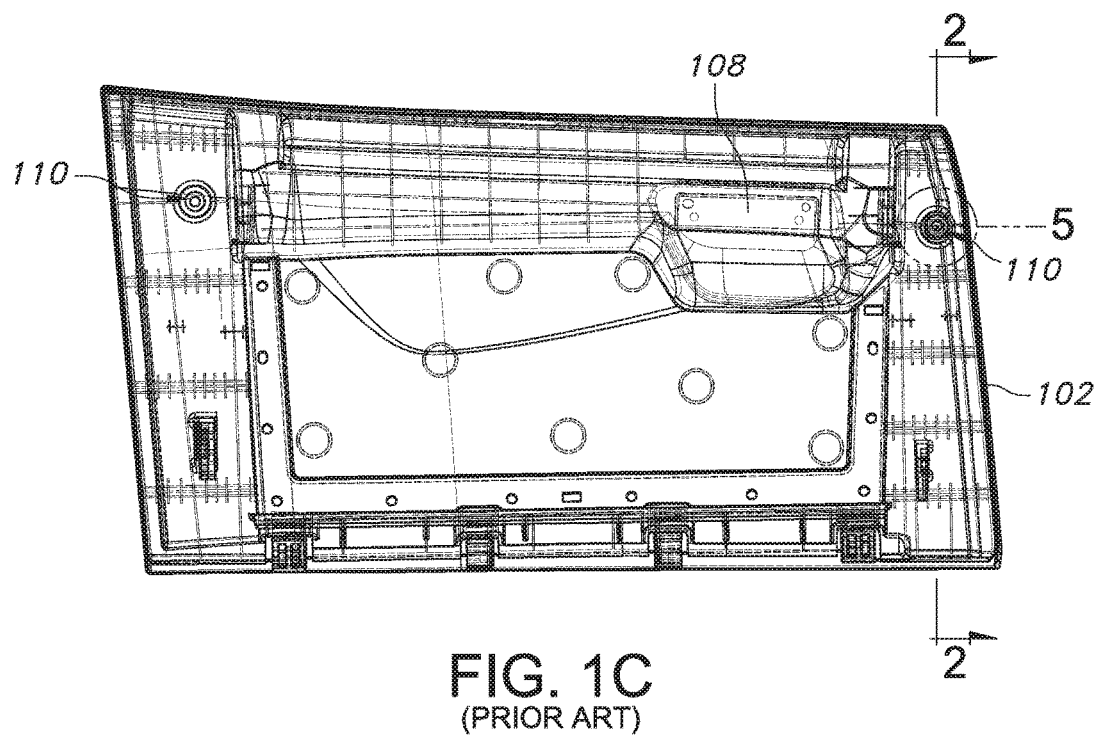
FIG. 1C shows a rear perspective view of the door assembly of FIG. 1A.

FIG. 1A-1B depict a glove box 100 including a hinged door assembly 102 and at least one side wall 104 defining an interior storage compartment 106. A latching mechanism 108 is provided, which as is known allows the door assembly 102 to be latched and/or locked for safety. With reference to FIG. 1C, it is known also to provide bumpers 110 which, when the door assembly 102 is in the closed position shown in FIG. 1A, provide a snug fit and reduce the tendency of the door assembly to squeak, rattle, etc.

Figure 2:
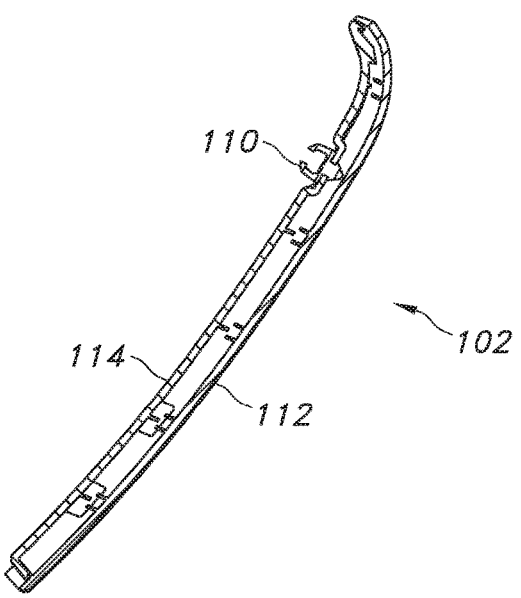
FIG. 2 shows a side cross-sectional view of a prior art interior door assembly.

FIG. 2 shows a side cross-sectional view of the door assembly 102. As can be seen, the door assembly 102 includes an outer panel 112 and an inner panel 114. In conventional door assembly designs, bumpers 110 are associated with the door inner panel, with attendant disadvantages as described above.

Figure 3:
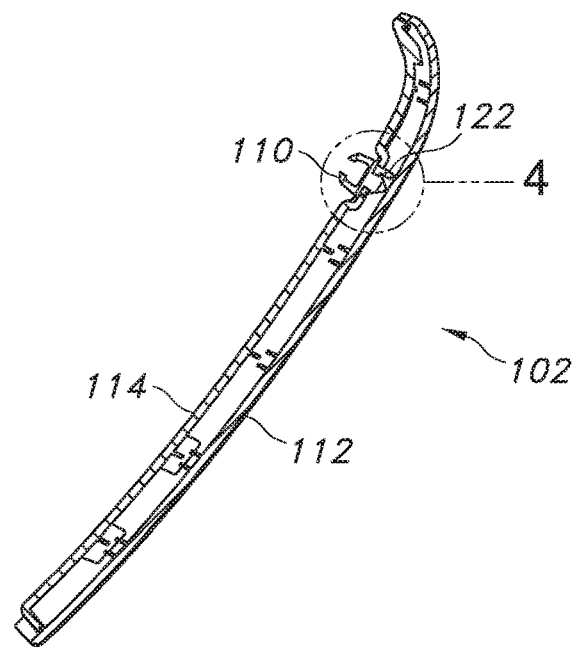
FIG. 3 shows a side cross-sectional view of a door assembly according to the present disclosure.

FIG. 3 shows a side cross-sectional view of a door assembly 120 according to the present disclosure, including an outer panel 112 and an inner panel 114. The outer panel 112 includes an inner panel locator feature 122 which further defines a bumper 110 retainer.

Figure 4:
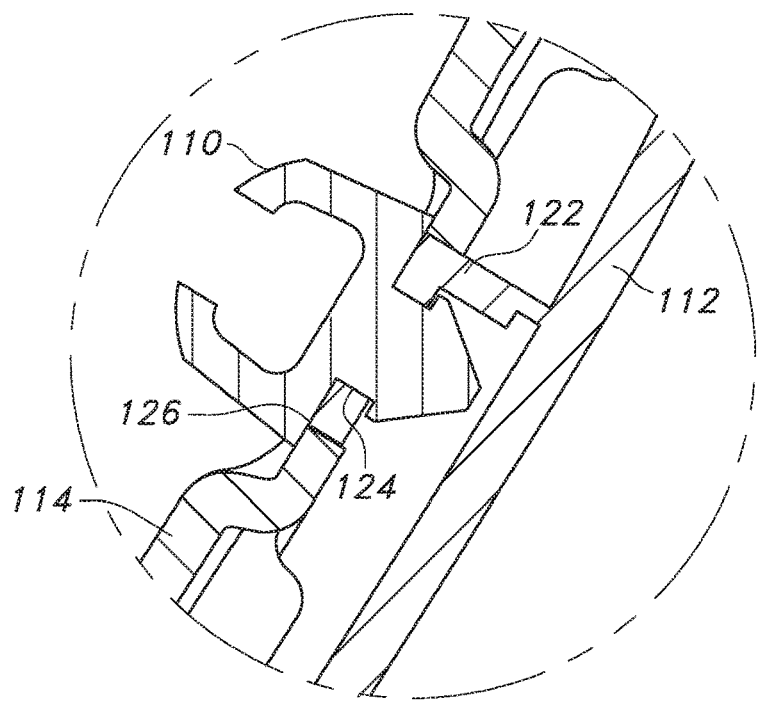
FIG. 4 shows a side cross-sectional view of the door assembly of FIG. 3, including an inner door panel locator feature.

This is shown in greater detail in FIG. 4. As can be seen therein the inner panel locator feature 122 includes an aperture 124 which serves to retain a bumper 110 in place. In the depicted embodiment, the bumper 110 and cooperating aperture 124 are configured and dimensions to provide a secure snap fit. As shown and as will be further described, the inner panel locator feature 122 having a bumper 110 retained therein locates a cooperating aperture 126 in the inner panel 114, and by that mechanism allows proper seating of the inner panel to the outer panel 112.

Figure 5:
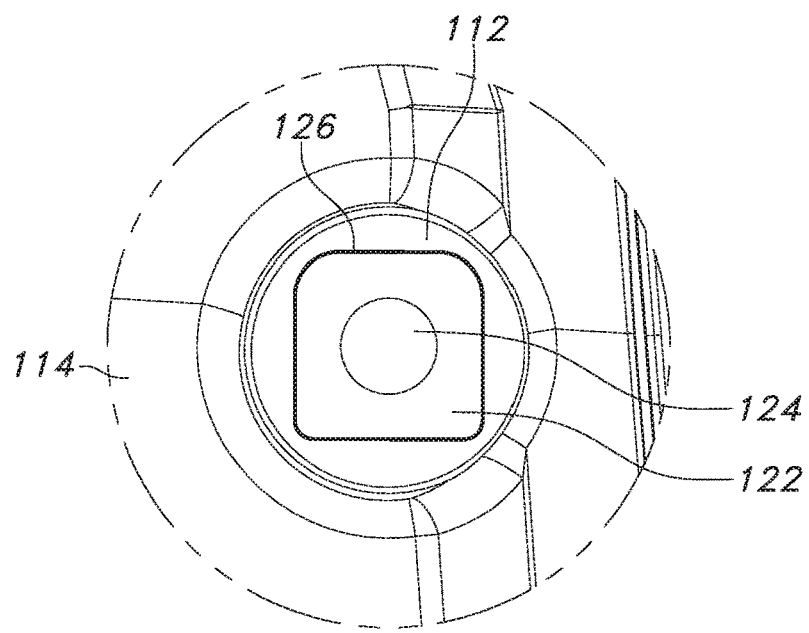
FIG. 5 is a front view of the inner door panel locator feature of FIG. 4.

FIG. 5 shows a front view of an inner panel 114 including aperture 126, through which can be seen the outer panel 112 and locator feature 122. As shown, the locator feature 122 defines a substantially quadrilateral cross-section, in the depicted embodiment being a square, for ease of molding. Moreover, use of a substantially quadrilateral locator feature 122 provides an added convenience in that a four-way locator is defined which improves the ease and accuracy with which the inner panel 114 can be seated over the outer panel 112.

Figure 6:
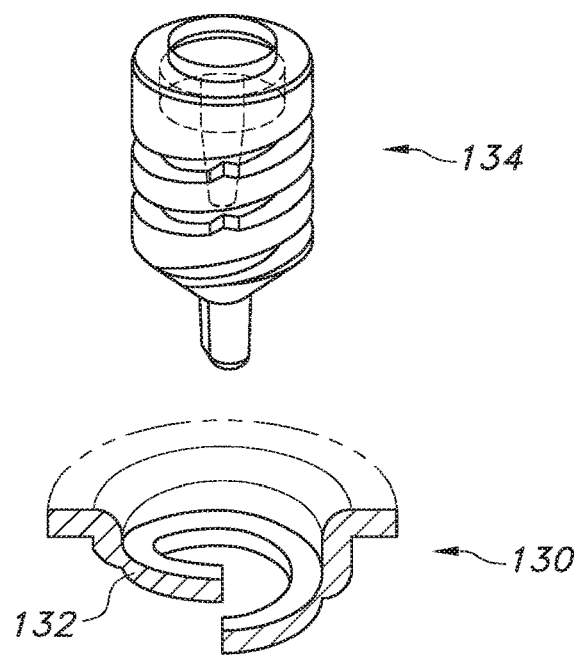
FIG. 6 shows an embodiment of a bumper according to the present disclosure.

In an alternative embodiment shown in FIG. 6, an inner panel locator feature 130 is provided which is configured with a screw-threaded aperture 132. In turn, a bumper 134 is provided including a cooperating screw-threaded exterior surface 136. As will be appreciated, this arrangement provides a degree of adjustability to the bumper 134. That is, the bumper 134 can be inserted into a screw-threaded aperture 132 to a greater or lesser depth, as needed, to provide a desired degree of snugness to the fit between the door assembly 100 and the storage compartment 106.

As will be appreciated, by use of the described assembly a bumper 110/134 is disposed in to the same door body, i.e. outer panel 112, that carries the latch mechanism 108. This reduces stack-up in tolerance encountered by prior art designs. The assembly further provides beneficial improvements in fit and finish for the door assembly 102, i.e. lessened margins between the outer panel 112 and the inner panel 114. This leads to improvements in latching operations, parts assembly, and others.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An interior door assembly for a vehicle, comprising:
    an outer door panel including at least one integral inner door panel locator feature defining a bumper retainer;
    an inner door panel including at least one aperture configured and dimensioned to engage the at least one inner door panel locator feature; and
    a resilient bumper adapted for retention by the bumper retainer to provide a snug fit to the closed interior door assembly.

2. The interior door assembly of claim 1, wherein the inner door panel locator feature defines a quadrilateral cross-section.

3. The interior door assembly of claim 2, wherein the inner door panel locator feature defines a square cross-section.

4. The interior door assembly of claim 1, wherein the at least one bumper retainer is dimensioned to receive a portion of the bumper therein.

5. The interior door assembly of claim 4, wherein the retainer is configured to retain the portion of the bumper by one of a snap-fit, a friction fit, an interference fit, and a screw-threaded fit.

6. The interior door assembly of claim 5, wherein the bumper comprises a screw-threaded exterior surface.

7. An interior door assembly for a vehicle, comprising:
    an outer door panel including at least one integral inner door panel locator feature defining a bumper retainer;
    an inner door panel including at least one aperture configured and dimensioned to engage the at least one inner door panel locator feature;
    a latch mechanism carried by the outer door panel; and
    a resilient bumper adapted for retention by the bumper retainer to provide a snug fit to the closed interior door assembly.

8. The interior door assembly of claim 7, wherein the inner door panel locator feature defines a quadrilateral cross-section.

9. The interior door assembly of claim 8, wherein the inner door panel locator feature defines a square cross-section.

10. The interior door assembly of claim 7, wherein the at least one bumper retainer is dimensioned to receive a portion of the bumper therein.

11. The interior door assembly of claim 10, wherein the retainer is configured to retain the portion of the bumper by one of a snap-fit, a friction fit, an interference fit, and a screw-threaded fit.

12. The interior door assembly of claim 11, wherein the bumper comprises a screw-threaded exterior surface.

\* \* \* \* \*